United States Patent
Takeuchi

(10) Patent No.: US 8,729,769 B2
(45) Date of Patent: May 20, 2014

(54) ELECTROMECHANICAL DEVICE, ROBOT, MOVABLE BODY, AND METHOD OF MANUFACTURING ELECTROMECHANICAL DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 155 days.

(21) Appl. No.: 13/488,961

(22) Filed: Jun. 5, 2012

(65) Prior Publication Data

US 2012/0313461 A1 Dec. 13, 2012

(30) Foreign Application Priority Data

Jun. 10, 2011 (JP) ................. 2011-129659

(51) Int. Cl.
*H02K 1/22* (2006.01)
(52) U.S. Cl.
USPC ........................ 310/261.1; 310/43
(58) Field of Classification Search
USPC .................... 310/261.1, 43; 29/596
See application file for complete search history.

(56) References Cited

U.S. PATENT DOCUMENTS

| | | | | |
|---|---|---|---|---|
| 5,122,704 A | * | 6/1992 | Blakeley et al. ............ | 310/54 |
| 6,040,644 A | * | 3/2000 | Schuster ................ | 310/43 |
| 6,047,461 A | * | 4/2000 | Miura et al. ............. | 29/598 |
| 6,072,252 A | * | 6/2000 | Van Dine et al. .......... | 310/43 |
| 7,230,402 B2 | | 6/2007 | Kumagai et al. | |
| 7,253,578 B2 | | 8/2007 | Kumagai et al. | |
| 2005/0085147 A1 | * | 4/2005 | Homma et al. ........... | 442/218 |

FOREIGN PATENT DOCUMENTS

| | | |
|---|---|---|
| JP | 63-39782 | 2/1988 |
| JP | 2002-303257 | 10/2002 |
| JP | 2005-014100 | 1/2005 |
| JP | 2007-162843 | 6/2007 |
| WO | WO2004/078423 | 9/2004 |

OTHER PUBLICATIONS

Citizen Micro HumanTech, "Servomotor with built-in Strain Wave Gearing WaveDriveSystem®" pp. 1-12 (Sep. 2010).

* cited by examiner

*Primary Examiner* — Nguyen N Hanh
(74) *Attorney, Agent, or Firm* — Harness, Dickey & Pierce, P.L.C.

(57) ABSTRACT

An electromechanical device includes: a center shaft; a rotor having a rotor magnet disposed around an outer periphery of the center shaft; and a stator disposed on an outer periphery of the rotor, wherein the center shaft is formed of a carbon-fiber-reinforced plastic, and when projection is performed in a radial direction from the center shaft toward the rotor magnet, an angle between a direction of carbon fiber in the carbon-fiber-reinforced plastic and a direction of the center shaft is 45°.

8 Claims, 16 Drawing Sheets

| CFRP CONDITION | | TORSIONAL BREAKING TORQUE | | |
|---|---|---|---|---|
| WINDING ANGLE | SAMPLE | BREAKING TORQUE | MINIMUM VALUE | AVERAGE VALUE |
| DEGREES | No. | [Nm] | [Nm] | [Nm] |
| 45 | 1 | 14.50 | 10.00 | 12.97 |
| | 2 | 14.40 | | |
| | 3 | 10.00 | | |
| 60 | 4 | 4.60 | 4.60 | 5.41 |
| | 5 | 5.44 | | |
| | 6 | 6.20 | | |
| 90 | 7 | 5.78 | 5.11 | 5.73 |
| | 8 | 6.30 | | |
| | 9 | 5.11 | | |

FIG. 4

WINDING DIRECTION ⇒

| SG | OG | PC | SPEED REDUCTION RATIO | SPEED INCREASE AND REDUCTION | ROTATIONAL DIRECTION |
|---|---|---|---|---|---|
| INPUT UNIT | FIXING UNIT | OUTPUT UNIT | $Za / (Za + Zc)$ | SPEED REDUCTION | SAME DIRECTION |
| FIXING UNIT | INPUT UNIT | OUTPUT UNIT | $Zc / (Za + Zc)$ | SPEED REDUCTION | SAME DIRECTION |
| FIXING UNIT | OUTPUT UNIT | INPUT UNIT | $(Za + Zc) / Zc$ | SPEED INCREASE | SAME DIRECTION |
| OUTPUT UNIT | FIXING UNIT | INPUT UNIT | $(Za + Zc) / Za$ | SPEED INCREASE | SAME DIRECTION |
| INPUT UNIT | OUTPUT UNIT | FIXING UNIT | $- Za / Zc$ | SPEED REDUCTION | REVERSE DIRECTION |
| OUTPUT UNIT | INPUT UNIT | FIXING UNIT | $- Zc / Za$ | SPEED INCREASE | REVERSE DIRECTION |

FIG.13

ELECTROMECHANICAL DEVICE, ROBOT, MOVABLE BODY, AND METHOD OF MANUFACTURING ELECTROMECHANICAL DEVICE

BACKGROUND

1. Technical Field

The present invention relates to an electromechanical device, a robot, a movable body, and a method of manufacturing an electromechanical device.

2. Related Art

A rotating device of an industrial robot is known which uses a motor (electric motor) that has a hollow rotating shaft and has wires through the hollow portion (for example, refer to WO2004/078423).

A rotor unit requires a torsional strength, and thus using a resin for a reduction in the weight of the electric motor had not been sufficiently studied.

SUMMARY

An advantage of some aspects of the invention is that it provides a rotor unit made of a resin and an increase in torsional strength.

APPLICATION EXAMPLE 1

This application example is directed to an electromechanical device including: a center shaft; a rotor having a rotor magnet disposed around an outer periphery of the center shaft; and a stator disposed on an outer periphery of the rotor, wherein the center shaft is formed of a carbon-fiber-reinforced plastic, and when projection is performed in a radial direction from the center shaft toward the rotor magnet, the angle between the direction of the carbon fiber in the carbon-fiber-reinforced plastic and the direction of the center shaft is 45°.

According to this application example, since the angle between the direction of carbon fiber in the carbon-fiber-reinforced plastic and the direction of the center shaft is 45°, it is possible to increase the torsional strength of the center shaft.

APPLICATION EXAMPLE 2

This application example is directed to the electromechanical device according to Application Example 1, wherein the carbon-fiber-reinforced plastic of the center shaft is made by solidifying, with a resin into a cylindrical shape, woven fabric formed by plaiting flatly bundled carbon fiber bundles.

According to this application example, the angle between the direction of carbon fibers in the carbon-fiber-reinforced plastic and the direction of the center shaft may be 45°.

APPLICATION EXAMPLE 3

This application example is directed to a robot including the electromechanical device according to Application Example 1 or 2.

APPLICATION EXAMPLE 4

This application example is directed to a movable body including the electromechanical device according to Application Example 1 or 2.

APPLICATION EXAMPLE 5

This application example is directed to the movable body according to Application Example 4, wherein the movable body may be a vehicle.

APPLICATION EXAMPLE 6

This application example is directed to a method of manufacturing an electromechanical device including: forming a carbon fiber bundle using carbon fiber; forming a woven fabric by plaiting the carbon fiber bundles; winding the woven fabric into a cylindrical shape so that an angle between a direction of the carbon fiber of the woven fabric and a winding direction becomes 45°; producing a center shaft by solidifying the woven fabric with a carbon-fiber-reinforced plastic; disposing a permanent magnet around a periphery of the center shaft; forming a rotor by molding the center shaft and the permanent magnet using a resin; and assembling the rotor to a stator having an electromagnetic coil.

According to this application example, it is possible to easily manufacture the electromechanical device having the center shaft in which the angle between the direction of the carbon fiber in the carbon-fiber-reinforced plastic and the direction of the center shaft is 45°.

The invention may be implemented in various forms, and for example, may be implemented in forms including, as well as the electromechanical device such as a motor or a generation device, a robot using the electromechanical device, a method of manufacturing the electromechanical device, and the like.

BRIEF DESCRIPTION OF THE DRAWINGS

The invention will be described with reference to the accompanying drawings, wherein like numbers reference like elements.

FIG. 4 is a diagram illustrating the relationship between the winding direction of the carbon fiber woven fabric and a torsional breaking torque of a center shaft.

FIG. 13 is a diagram showing the relationships between inputs, outputs, increases in speed, and reductions in speed of a sun gear (SG), an outer gear (OG), and a planetary carrier (PC).

DESCRIPTION OF EXEMPLARY EMBODIMENTS

First Embodiment

Figures 1A, 1B:
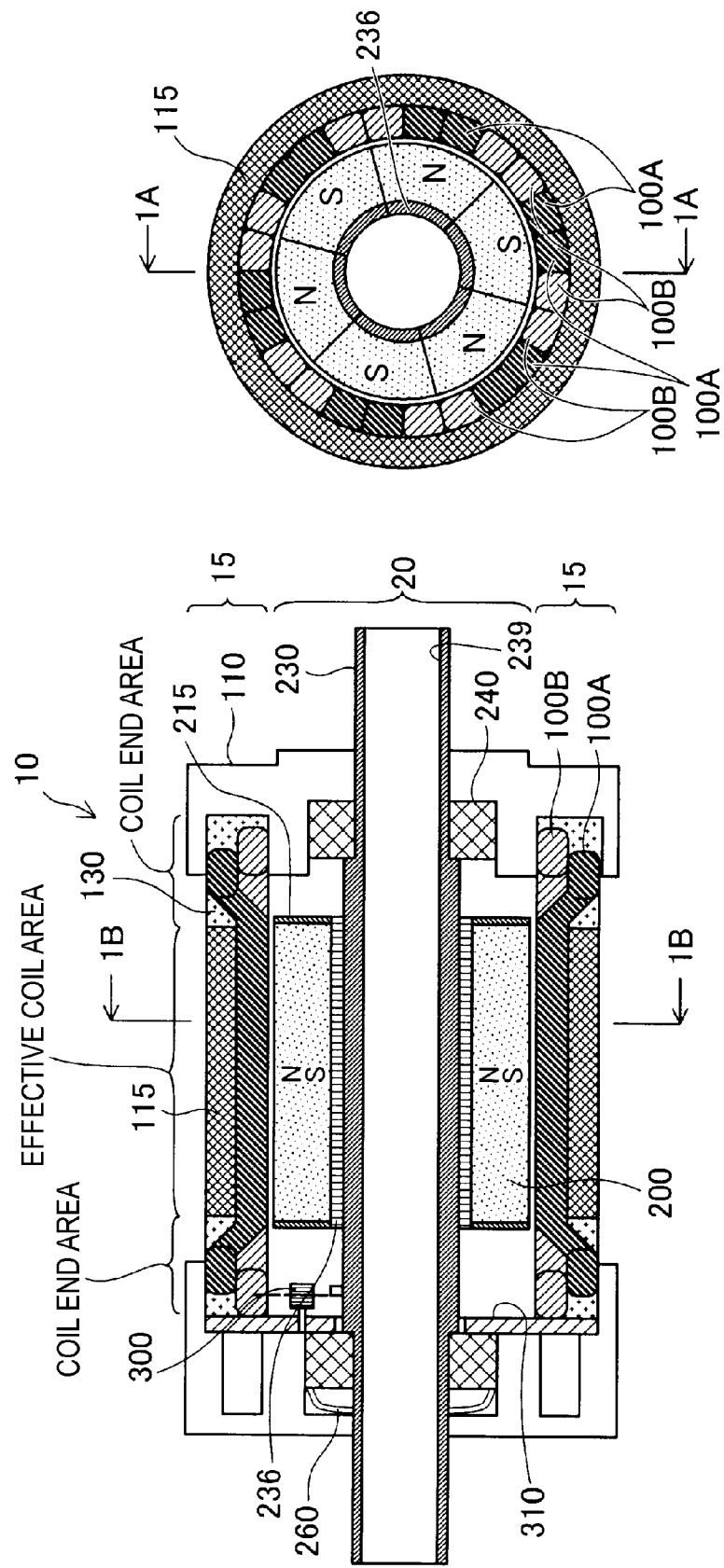
FIGS. 1A and 1B are diagrams illustrating the construction of a coreless motor.

FIGS. 1A and 1B are diagrams illustrating the construction of a coreless motor. FIG. 1A shows a cross-section taken along the section (the section IA-IA of FIG. 1B) parallel to a center shaft 230 of a coreless motor 10. FIG. 1B shows a cross-section taken along the section (the section IB-IB of FIG. 1A) perpendicular to the center shaft 230 of the coreless motor.

The coreless motor 10 is an inner rotor type motor in which a substantially cylindrical stator 15 is disposed on the outside, and a substantially cylindrical rotor 20 is disposed on the inside. The stator 15 includes electromagnetic coils 100A and 100B, a casing 110, a coil back yoke 115, and a magnetic sensor 300. The rotor 20 includes the center shaft 230, permanent magnets 200, a magnet side yoke 215, a magnet back yoke 236, a bearing 240, and a wave spring washer 260.

The rotor 20 has the center shaft 230 at the center, and on the outer periphery of the center shaft 230, the magnet back yoke 236 is disposed. On the outer periphery of the magnet back yoke 236, six permanent magnets 200 are disposed. The six permanent magnets 200 include permanent magnets 200 magnetized in an outward direction (radial direction) from the center of the center shaft 230, and permanent magnets 200 magnetized in an outward direction (center direction) from the center. The permanent magnets 200 of which the magnetization direction is the center direction and the permanent magnets 200 of which the magnetization direction is the radial direction are alternately disposed along the circumferential direction. At an end portion of the permanent magnet 200 in the center shaft 230 direction, the magnet side yoke 215 is provided. The magnet side yoke 215 is a discoid member formed of a soft magnetic material. In the magnetic flux flowing from the permanent magnet 200, a magnetic flux leaking in the center shaft 230 direction is more likely to pass through the magnet side yoke 215. The center shaft 230 is formed of carbon-fiber-reinforced plastic and has a through-hole 239. The center shaft 230 is supported by the bearing 240 of the casing 110 and is mounted to the casing 110. In addition, in this embodiment, on the inside of the casing 110, the wave spring washer 260 is provided, the wave spring washer 260 determining the position of the permanent magnets 200. Here, the wave spring washer 260 may be omitted.

The casing 110 is a substantially cylindrical housing. The two-phase electromagnetic coils 100A and 100B are arranged along the inner periphery of the casing. The electromagnetic coils 100A and 100B have an effective coil area and a coil end area. Here, the effective coil area is an area that exerts the Lorentz force in a rotational direction on the rotor 20 when current flows through the electromagnetic coils 100A and 100B, and the coil end area is an area that exerts the Lorentz force in a direction different from the rotational direction on the rotor 20 when current flows through the electromagnetic coils 100A and 100B. Here, two coil end areas are present with the effective coil area interposed therebetween, and the Lorentz forces thereof are equal in magnitude, are opposite in direction, and thus cancel each other. In the effective coil area, conductor wiring making up the electromagnetic coils 100A and 100B is in a direction substantially parallel to the rotational axis, and in the coil end area, conductor wiring making up the electromagnetic coils 100A and 100B is in parallel to the rotational direction. In addition, in the effective coil area, the electromagnetic coils 100A and 100B overlap the permanent magnet 200, while the electromagnetic coils 100A and 100B do not overlap the permanent magnet 200 in the coil end area. The electromagnetic coils 100A and 100B are collectively called an electromagnetic coil 100. The coil back yoke 115 is provided between the electromagnetic coils 100A and 100B and the casing 110. The length in the center shaft 230 direction of the coil back yoke 115 is substantially equal to the length in the center shaft 230 direction of the permanent magnet 200. When radiating lines are drawn in the radial direction toward the coil back yoke 115 from the center shaft 230, the radiating lines exactly penetrate the permanent magnet 200. That is, the coil back yoke 115 overlaps the permanent magnet 200.

Moreover, in the stator 15, the magnetic sensor 300, as a position sensor for detecting the phase of the rotor 20, is disposed for each of the phases of the electromagnetic coils 100A and 100B. In FIG. 1A, only one magnetic sensor 300 is displayed. The magnetic sensor 300 is fixed on a circuit board 310, and the circuit board 310 is fixed to the casing 110. Here, when a perpendicular line is drawn from the coil end area to the center shaft 230, the magnetic sensor 300 is disposed on the perpendicular line.

Figure 2:
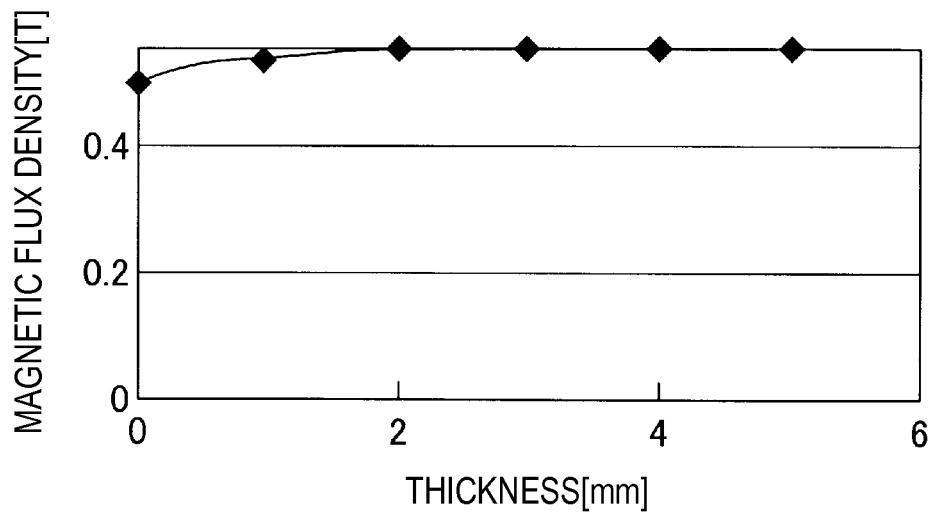
FIG. 2 is a graph showing the relationship between the thickness of a coil back yoke in a first embodiment and the magnetic flux density of the surface of the coil back yoke.

FIG. 2 is a graph showing the relationship between the thickness of the magnet back yoke in the first embodiment and the magnetic flux density of the surface on the coil back yoke 115 side of the permanent magnet 200. As seen from FIG. 2, as the thickness of the magnet back yoke 236 is increased, the magnetic flux density of the magnet surface is increased. However, the magnetic flux density of the magnet surface when the thickness of the magnet back yoke 236 is equal to or greater than 2 mm is substantially equal to the magnetic flux density when the thickness of the magnetic back yoke 236 is 2 mm. That is, even though the magnet back yoke 236 is thickened to be equal to or greater than 2 mm in thickness, the magnetic flux density of the magnet surface is not increased.

Figure 3:
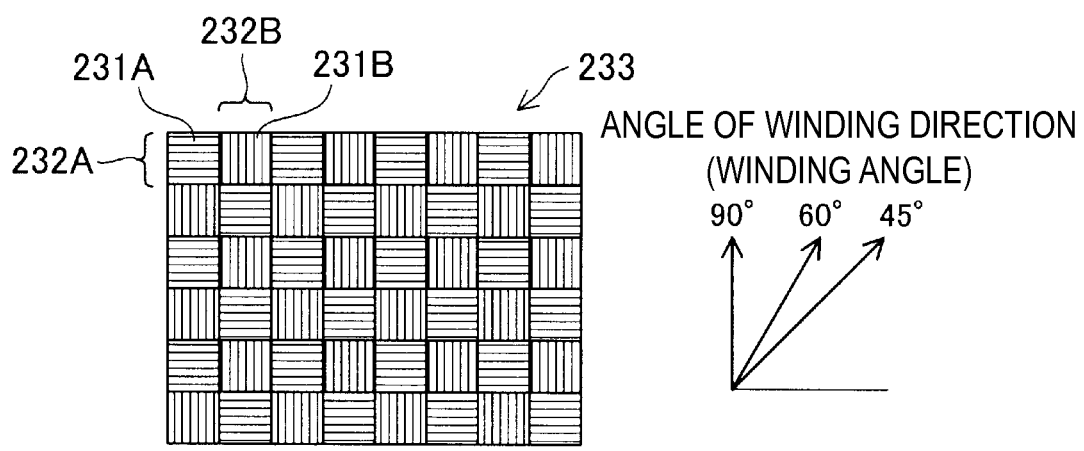
FIG. 3 is a diagram illustrating woven fabric of carbon fiber which is a material forming the center shaft.

FIG. 3 is a diagram illustrating a woven fabric of carbon fiber which is a material forming the center shaft. A carbon fiber woven fabric 233 is formed by plaiting so that carbon fiber bundles 232A and 232B intersect. Here, the carbon fiber bundles 232A and 232B are the same material, and attaching of different symbols is for distinguishing between vertically and horizontally woven bundles during plaiting. When the two are not distinguished, the carbon fiber bundles 232A and 232B are referred to as a carbon fiber bundle 232. The carbon fiber bundle 232 is formed by weaving a carbon fiber 231 into a slender flat strip.

The arrows shown to the right of the carbon fiber woven fabric 233 represent winding directions of the carbon fiber woven fabric 233. The winding directions of the carbon fiber woven fabric 233 are directions perpendicular to the center shaft of a rolled hollow cylindrical carbon fiber woven fabric. In this embodiment, the magnitude of an angle between the direction of a carbon fiber 231A of the one carbon fiber bundle 232A and the winding direction of the carbon fiber woven fabric 233 is called the angle of winding direction. For example, in the case where the angle of winding direction is 90°, the direction of the carbon fiber 231A of the one carbon fiber bundle 232A is at 90° (perpendicular) with respect to the winding direction of the carbon fiber woven fabric 233 and is parallel to the center shaft of the rolled carbon fiber woven fabric 233. Here, the direction of a carbon fiber 231B of the other carbon fiber bundle 232B is parallel to the winding direction of the carbon fiber woven fabric 233. Similarly, in the case where the angle of winding direction is 60°, the direction of the carbon fiber 231A of the one carbon fiber bundle 232A is at an angle of 60° with respect to the winding direction of the carbon fiber woven fabric 233, and the direction of the carbon fiber 231B of the other carbon fiber bundle 232B is at an angle of 30° (=90°−60°) with respect to the winding direction of the carbon fiber woven fabric 233. In the case where the angle of winding direction is 45°, either the direction of the carbon fiber 231A of the carbon fiber bundle 232A or the direction of the carbon fiber 231B of the carbon fiber bundle 232B is at an angle of 45° with respect to the winding direction of the carbon fiber woven fabric 233. In addition, the angle between the direction of the carbon fiber 231A or 231B and the center shaft of the rolled carbon fiber woven fabric 233 is 45°. The angles of 90° and 60° when viewed from the carbon fiber 231A of the one carbon fiber bundle 232A become the angles of 0° and 30° when viewed from the carbon fiber 231B of the other carbon fiber bundle 232B, respectively. Here, the carbon fiber bundles 232A and 232B may be replaced with each other. Therefore, the case where the angle of winding direction is 60° is the same as the case where the angle of winding direction is 30°. Hereinafter, the angle between the direction of the carbon fiber 231A and the winding direction of the carbon fiber woven fabric 233 is also called the "winding direction".

FIG. 4 is a diagram illustrating the relationship between the winding direction of the carbon fiber woven fabric and the torsional breaking torque of the center shaft. From FIG. 4, the torsional breaking torque may be maximized by rolling the carbon fiber woven fabric 233 (FIG. 3) so that the winding angle is 45°.

Figure 5:
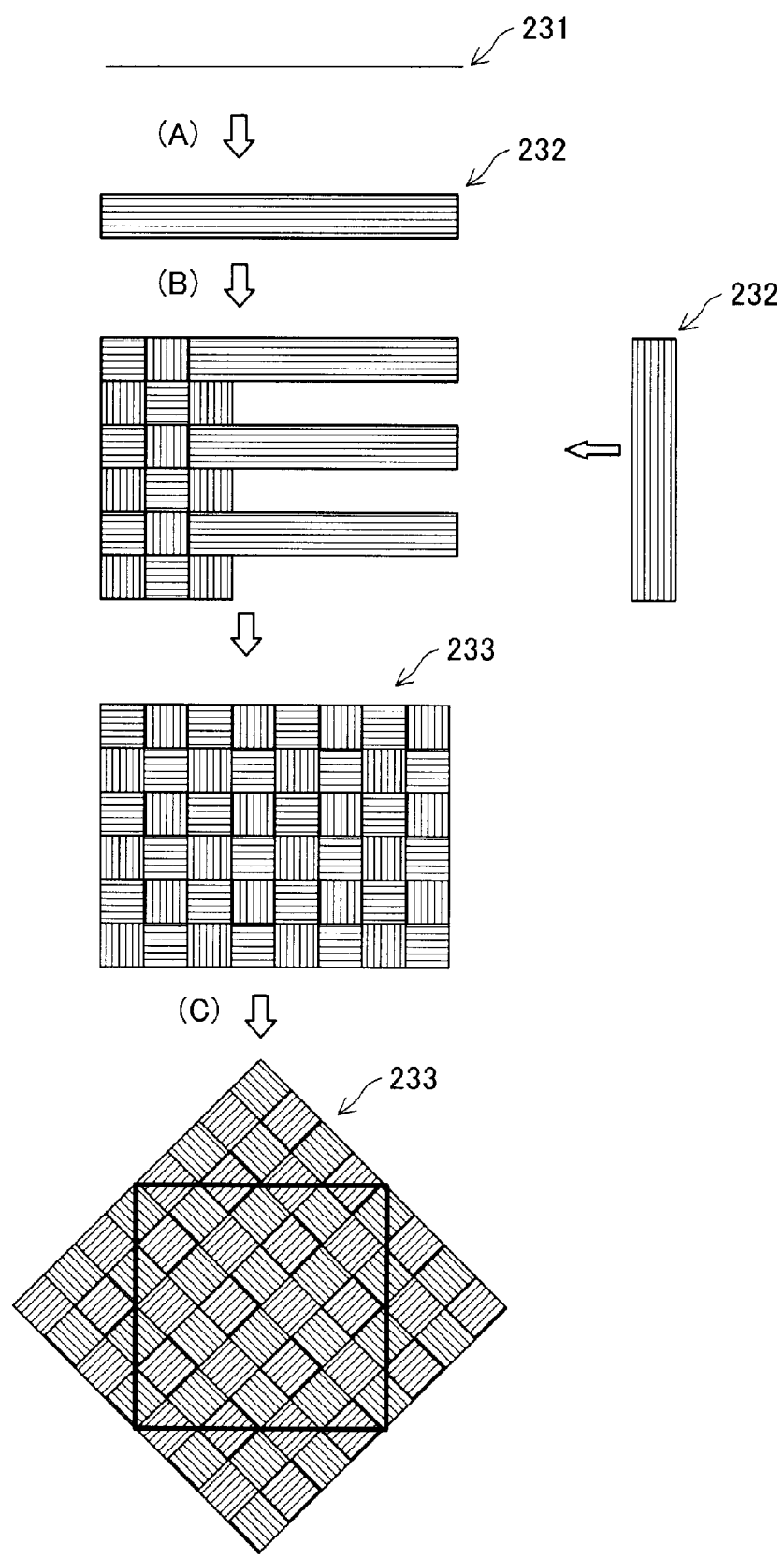
FIG. 5 is a diagram illustrating processes of producing the carbon fiber woven fabric.

FIG. 5 is a diagram illustrating processes of producing the carbon fiber woven fabric. First, in the process (A), the carbon fiber 231 is prepared, and the carbon fibers 231 are bundled to produce the slender carbon fiber bundle 232. Next, in the process (B), the carbon fiber bundles 232 are plaited to produce the carbon fiber woven fabric 233. In FIG. 5, a procedure of plaiting the carbon fiber bundles 232 is shown. Thereafter, in the process (C), the carbon fiber woven fabric 233 is cut into a rectangular shape. Here, cutting is performed so that each side of the rectangle is at 45° with respect to the direction of the carbon fiber.

Figure 6:
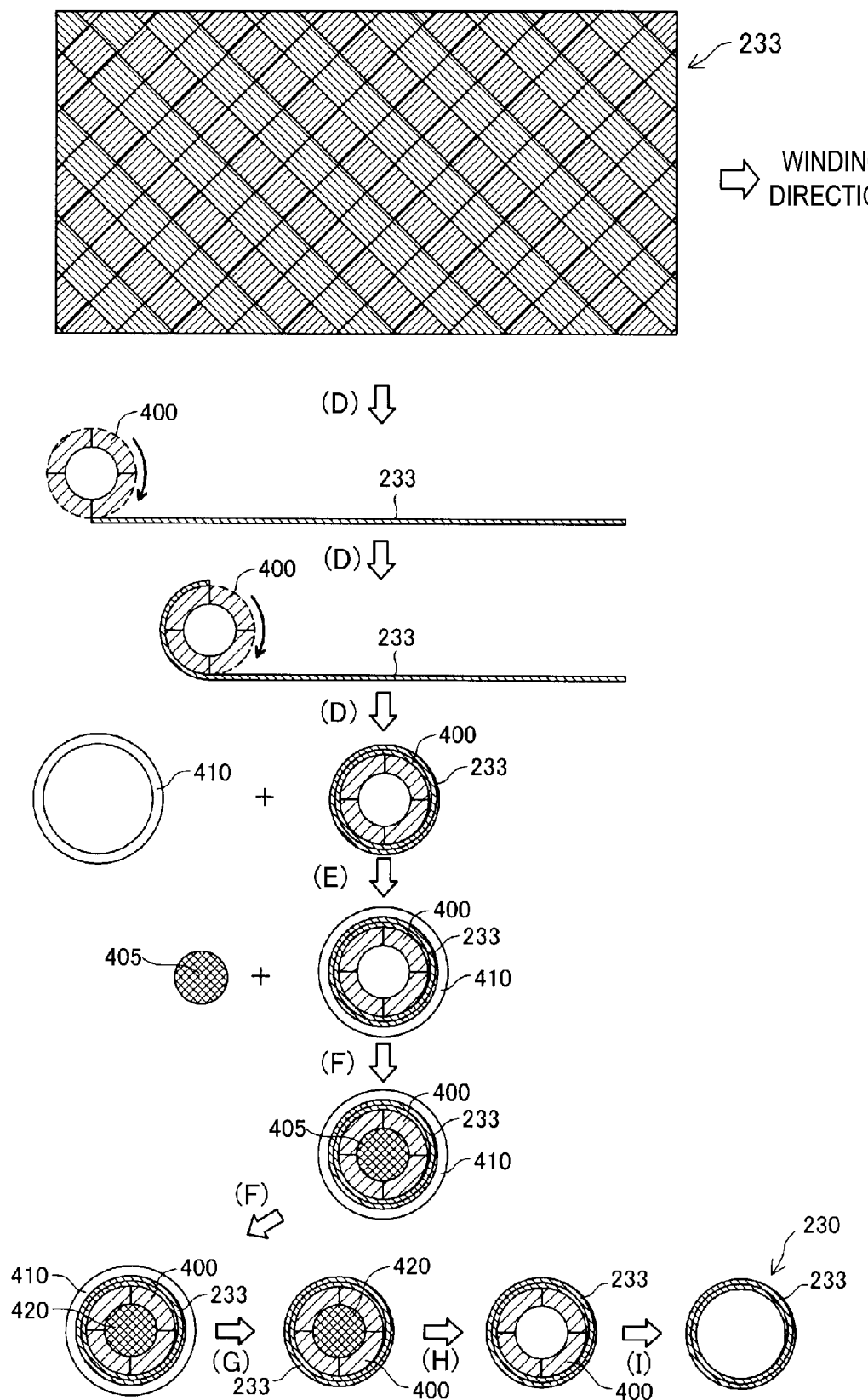
FIG. 6 is a diagram illustrating processes of producing the center shaft from the carbon fiber fabric.

FIG. 6 is a diagram illustrating processes of producing the center shaft 230 from the carbon fiber fabric. In the process (D), a releasing agent is applied to the outer periphery of a separation internal frame die 400, and the carbon fiber woven fabric 233 immersed into a resin for molding is wound. In this embodiment, the separation internal frame die 400 is able to be divided into four parts, and the shape of the united separation internal frame die 400 is cylindrical. In addition, the internal part of the separation internal frame die 400 is cavitary. The winding direction of the carbon fiber woven fabric 233 is a direction at an angle of 45° with respect to the carbon fiber 231 (FIG. 5) of the carbon fiber woven fabric 233. That is, the short side or the long side of the carbon fiber woven fabric 233 produced in the process (C) of FIG. 5 may be parallel to the axial direction of the cylinder formed by the separation internal frame die 400.

In the process (E), after a releasing agent is applied to the inner periphery of an external frame die 410, the separation internal frame die 400 around which the carbon fiber woven fabric 233 is wound is inserted into the external frame die 410. In the subsequent process (F), a pressurization frame die 405 is inserted into the internal cavity of the separation internal frame die 400. Here, heating is performed by the external frame die 410 and the pressurization frame die 405. The pressurization frame die 405 has, for example, a truncated cone shape, and as the thinner parts thereof are inserted from both sides of the separation internal frame die into the cavity of the internal part of the separation internal frame die 400, the separation internal frame die 400 may be pressurized against the external frame die 410. Accordingly, the carbon fiber woven fabric 233 immersed into the resin for molding is heated and compressed.

In the process (G), the external frame die 410 is removed. Since the releasing agent is applied to the inner periphery of the external frame die 410, the external frame die 410 may be easily detached. In the process (H), the pressurization frame die 405 is pulled out, and in the process (I), the parts of the separation internal frame die 400 are removed one by one. Accordingly, the center shaft 230 formed of the carbon-fiber-reinforced plastic may be formed.

Figure 7:
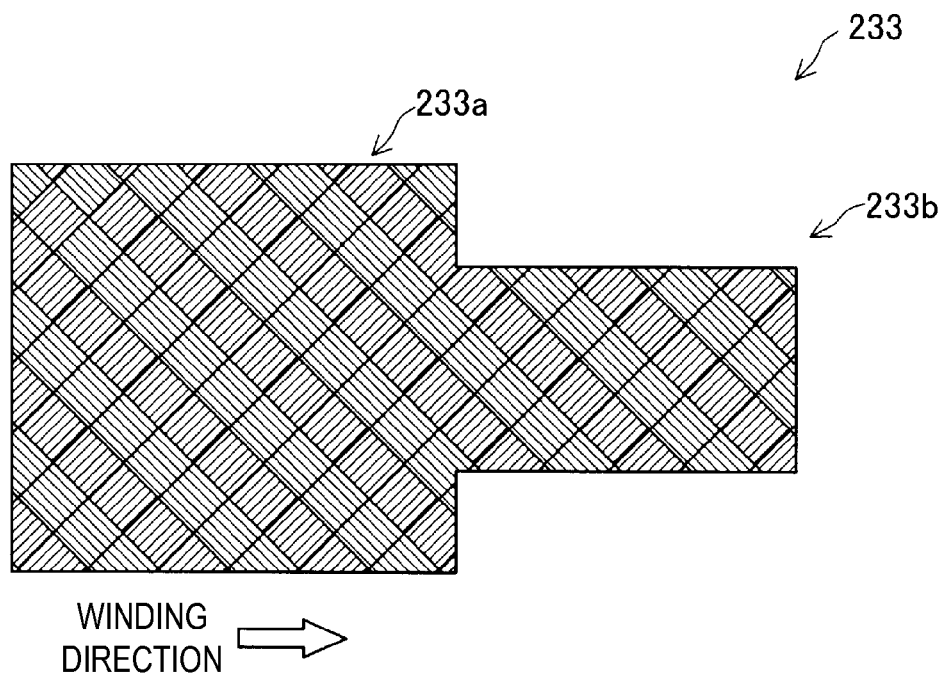
FIG. 7 is a diagram illustrating an example of modifying the shape of the carbon fiber woven fabric.

FIG. 7 is a diagram illustrating an example of modifying the shape of the carbon fiber woven fabric. The carbon fiber woven fabric 233 has a wide portion 233a and a narrow portion 233b in two rectangular shapes. Specifically, the carbon fiber woven fabric 233 has a shape in which the narrow portion 233b with a smaller width than that of the wide portion 233a is added to the wide portion 233a.

Figure 8:
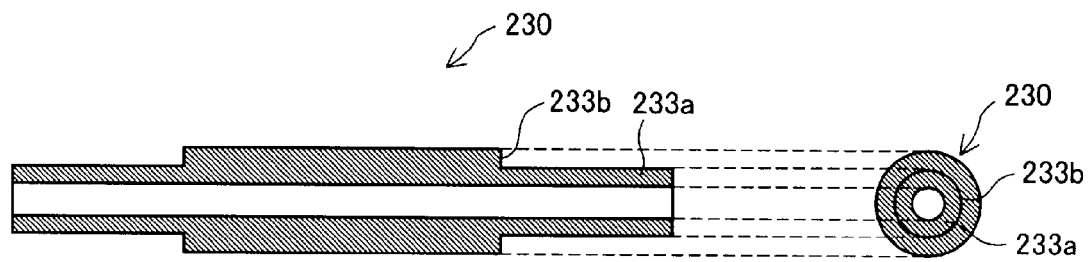
FIG. 8 is a diagram illustrating the center shaft formed using the carbon fiber woven fabric illustrated in FIG. 7.

FIG. 8 is a diagram illustrating the center shaft formed using the carbon fiber woven fabric 233 illustrated in FIG. 7. Since the carbon fiber woven fabric 233 illustrated in FIG. 7 has the narrow portion 233b in addition to the rectangular wide portion 233a, when the carbon fiber woven fabric 233 is wound around the separation internal frame die 400 by the processes shown in FIG. 6, the carbon fiber woven fabric corresponding to the part of the narrow portion 233b is wound to be thicker, and thus the thickness of the center shaft 230 in the part is increased. In addition, the wide portion 233a and the narrow portion 233b may be formed in a single sheet, or the wide portion 233a and the narrow portion 233b may be separated to be formed in two sheets. In this case, regarding the external frame die 410, external frame dies 410 with different inside diameters are used to correspond to the thicknesses of the carbon fiber woven fabric 233. This thick part may function as, for example, a protrusion for stopping a bearing.

Figure 9:
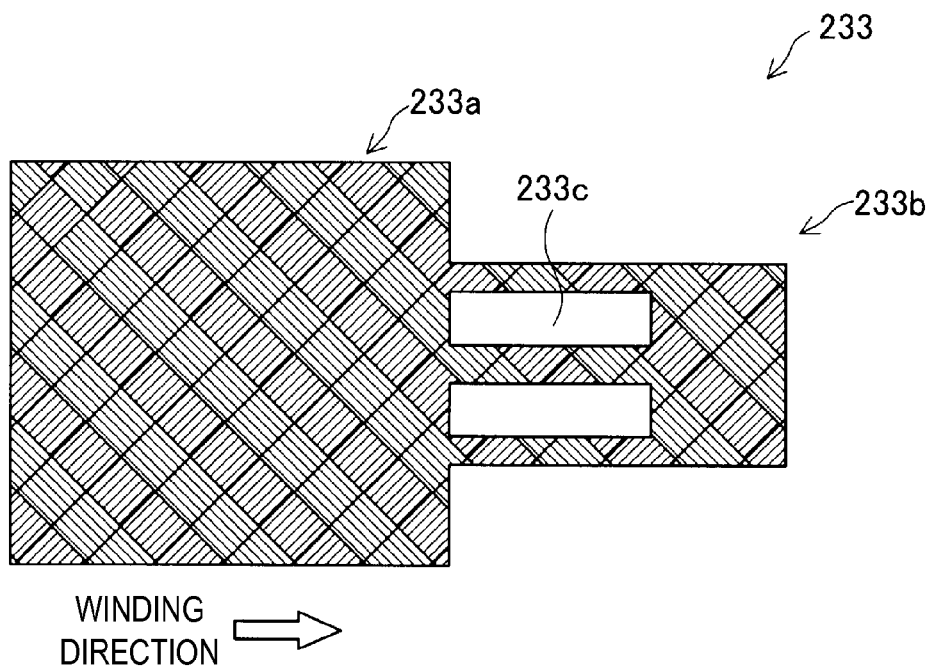
FIG. 9 is a diagram illustrating an example of modifying the shape of the carbon fiber woven fabric.

FIG. 9 is a diagram illustrating an example of modifying the shape of the carbon fiber woven fabric. The carbon fiber woven fabric 233 has cutout portions 233c in parts of the narrow portion 233b of the carbon fiber woven fabric 233 illustrated in FIG. 7.

Figure 10:
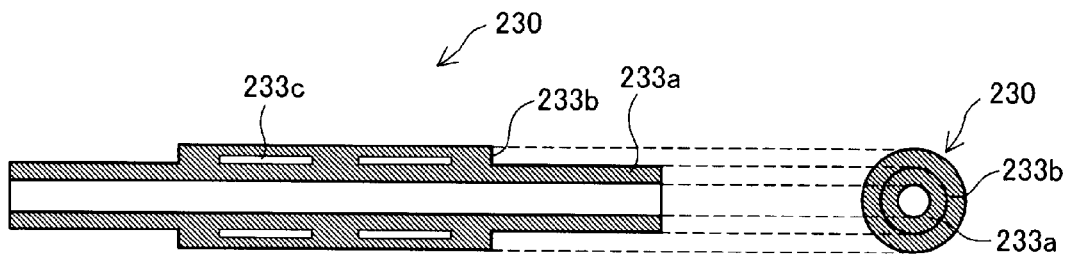
FIG. 10 is a diagram illustrating the center shaft formed by using the carbon fiber woven fabric illustrated in FIG. 9.
Figure 11A:
FIG. 11 is a diagram showing processes of manufacturing a rotor.
Figure 11B:
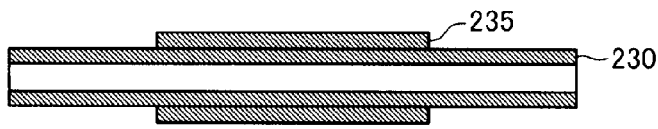
Figure 11C:
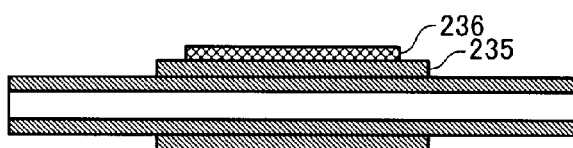
Figure 11D:
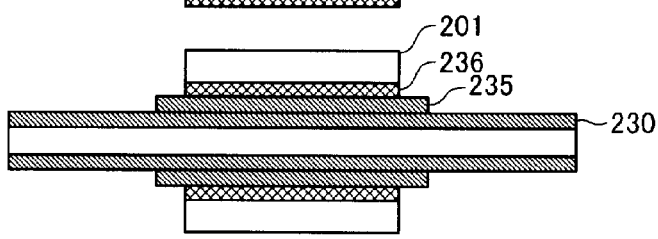
Figure 11E:
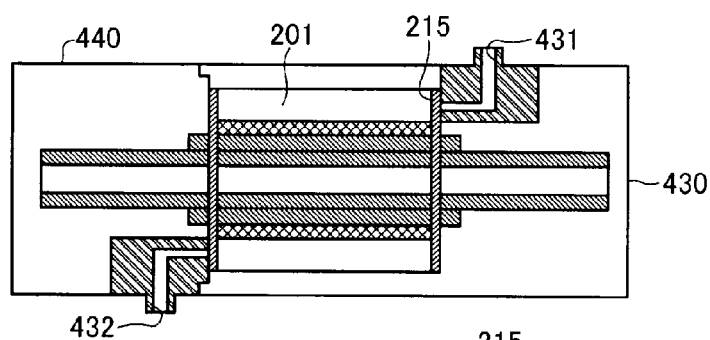
Figure 11F:
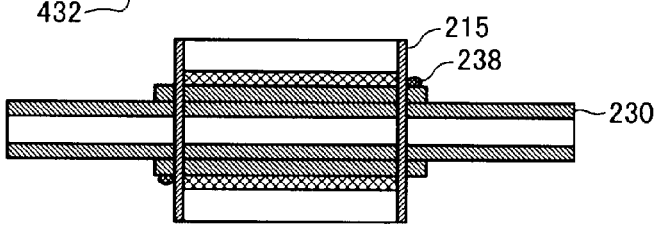
Figure 11G:
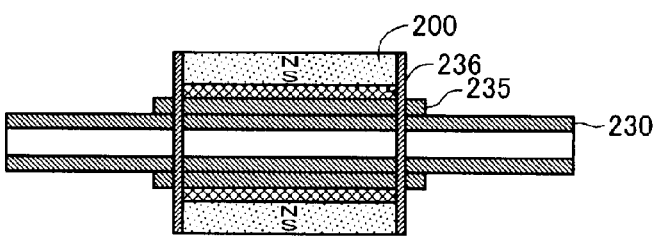
Figure 11H:
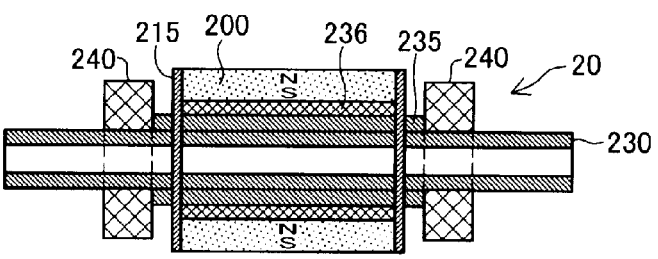

FIG. 10 is a diagram illustrating a center shaft formed by using the carbon fiber woven fabric 233 illustrated in FIG. 9.

Since the carbon fiber woven fabric 233 illustrated in FIG. 9 has the narrow carbon fiber woven fabric 233b, as illustrated in FIG. 8, the thickness of the center shaft 230 corresponding to the part of the narrow carbon fiber woven fabric 233b is increased. Moreover, at a position corresponding to a space 233c, a space (a hollow chamber) is formed.

FIG. 11 is a diagram showing processes of manufacturing the rotor 20. In the process (A), the center shaft 230 is prepared. The center shaft 230 may be produced by the processes shown in FIGS. 5 and 6. In the process (B), a pipe 235 as a shaft for stopping a bearing is fitted to the center shaft 230. Similar to the center shaft 230, the pipe 235 may also be produced by the processes shown in FIGS. 5 and 6. The diameter of the center shaft 230 corresponding to the pipe 235 part is increased. In the subsequent process, the permanent magnet 200 (FIG. 1A) is disposed in this part, and the bearings 240 (FIG. 1A) are disposed at both end portions of the pipe 235.

In the process (C), the center shaft 230 produced in the process (B) is inserted into the magnet back yoke 236 having a pipe shape. Here, the center shaft 230 is inserted to such a position (same position) that the pipe 235 substantially overlaps the magnet back yoke 236. The magnet back yoke 236 is formed of, for example, a soft magnetic material having a high B and a minimum H in the B-H curve into a laminated steel sheet material with a low iron loss.

In the process (D), a magnet 201 in a non-magnetized state of a polar anisotropic magnet (hereinafter, called a "non-magnetized magnet 201") is inserted to the same position as the magnet back yoke 236. The non-magnetized magnet 201 is magnetized from the outside in the subsequent process and is changed to the permanent magnet 200.

In the process (E), the non-magnetized magnet 201 and the center shaft 230 are integrated through molding using a resin. First, the magnet side yokes 215 are disposed at both end portions of the non-magnetized magnet 201, and moreover, an external die 430 is disposed. The external die 430 includes a resin injection port 431 and an air discharge port 432. A resin is injected from the resin injection port 431 and is pressurized and heated to mold and integrate the non-magnetized magnet 201 and the center shaft 230 in the resin.

In the process (F), the external die 430 is detached, and a balance weight 238 for balance adjustment is bonded. In addition, a part of the resin may be shaved for balancing.

In the process (G), for example, using an induction coil, the non-magnetized magnet 201 is magnetized from the outside. Even though magnetization is performed before the molding in the resin, there is a concern of the magnetic force being weakened by the heat during the molding. Therefore, it is preferable that magnetization is performed after the molding in the resin. In the process (H), the bearings 240 are inserted to the positions stopped by the pipe 235. Accordingly, the rotor 20 is produced.

As described above, according to this embodiment, the center shaft 230 having a high torsional strength may be produced of a resin.

Second Embodiment

Figure 12:
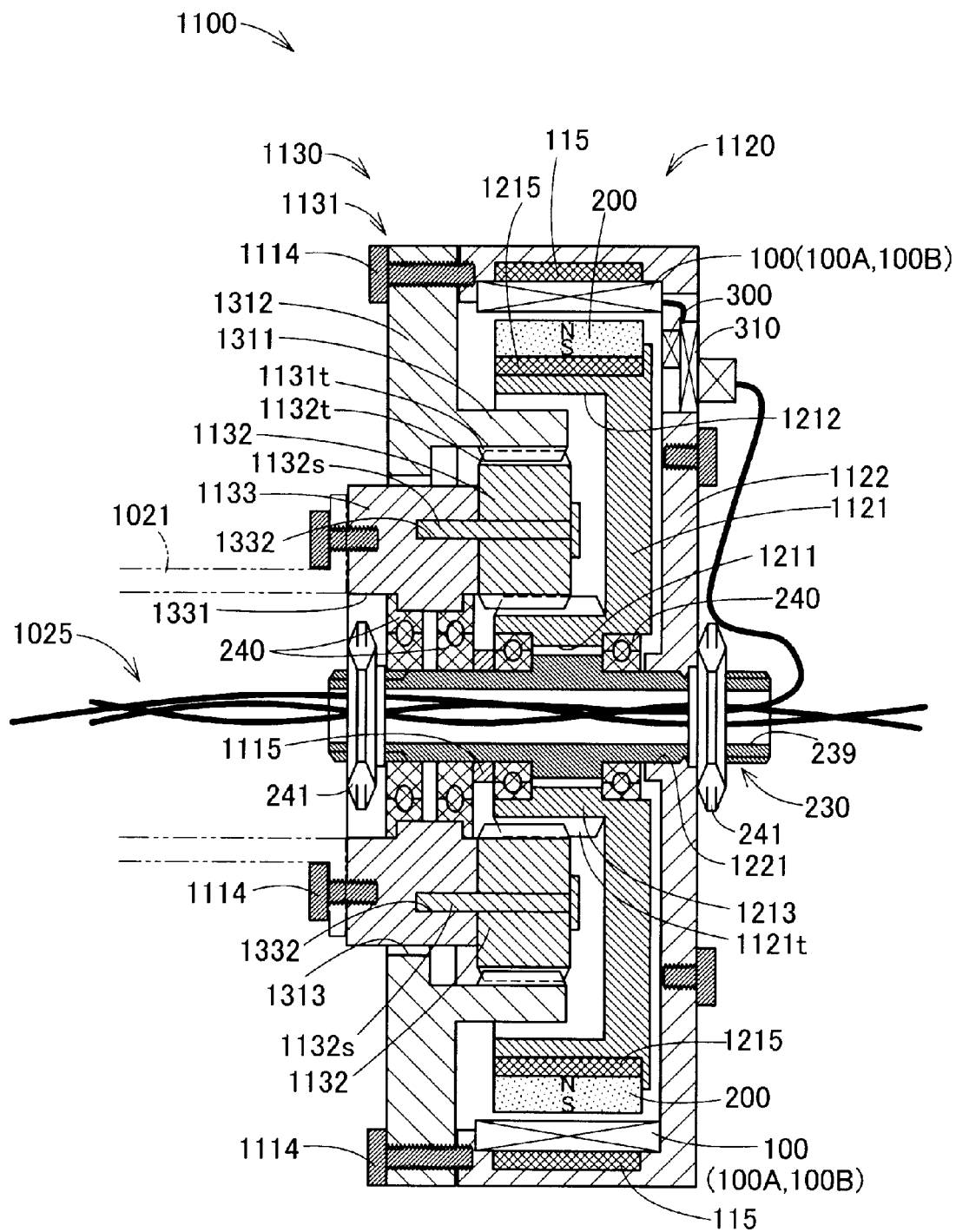
FIG. 12 is a schematic cross-sectional view illustrating the internal construction of a power generation device according to a second embodiment.

FIG. 12 is a schematic cross-sectional view illustrating the internal construction of a power generation device 1100 according to a second embodiment. The power generation device 1100 includes the center shaft 230, a motor unit 1120, and a rotation mechanism unit 1130. The motor unit 1120 and the rotation mechanism unit 1130 are disposed to be fitted and integrated with each other as described later, and the center shaft 230 is disposed to penetrate through the center of the integrated motor unit 1120 and the rotation mechanism unit 1130. The center shaft 230 has a through-hole 239 extending in the axial direction, and a conductor wire bundle 1025 is inserted through the through-hole 239. The center shaft 230 is formed of, as described above, the carbon-fiber-reinforced plastic made by solidifying the carbon fiber woven fabric of which the carbon fiber direction is at an angle of 45° with respect to the axial direction with the resin.

The motor unit 1120 includes a rotor 1121 and a casing 1122. The motor unit 1120 has a radial gap type construction as described below. The main body portion of the rotor 1121 has a substantially discoid shape, and the permanent magnets 200 are arranged in a cylindrical shape on the outer peripheral surface of the side wall of the main body portion thereof. The direction of the magnetic flux of the permanent magnets 200 is in the radial direction. In addition, on the rear surface of the permanent magnet 200 (on the surface of the side wall of the rotor 1121), a magnet back yoke 1215 for enhancing the magnetic force efficiency is disposed.

The rotor 1121 has a through-hole 1211 at the center to insert the center shaft 230 therethrough. In addition, between the inner wall surface of the through-hole 1211 and the outer peripheral surface of the center shaft 230, the bearings 240 are disposed to enable the rotor 1121 to rotate around the center shaft 230. The bearing 240 may be constructed as, for example, a ball bearing.

On the surface of the rotor 1121 on a side opposing the rotation mechanism unit 1130, a recessed portion 1212 formed as a substantially annular groove about the through-hole 1211 as the center is provided. On the wall surface of the outer side of a substantially cylindrical barrier 1213 that separates the through-hole 1211 and the recessed portion 1212 from each other, gear teeth 1121t are formed. Thereafter, the barrier 1213 having the gear teeth 1121t provided at the center of the rotor 1121 is called a "rotor gear 1213". As described later, in this embodiment, the rotor gear 1213 also functions as a sun gear of a planetary gear.

The casing 1122 is a substantially cylindrical hollow container body of which a surface on the side opposing the rotation mechanism unit 1130 is open and accommodates the rotor 1121. The casing 1122 may be made of a resin material such as carbon-fiber-reinforced plastic (CFRP). Accordingly, a reduction in the weight of the power generation device 1100 can be achieved.

At the center of the bottom surface of the casing 1122, a through-hole 1221 is formed to insert the center shaft 230 therethrough. The center shaft 230 and the casing 1122 are mounted to be fixed to each other. In addition, a bearing ring 241 is mounted to be fitted to the outer side of the casing 1122 to enhance holding characteristics of the center shaft 230.

On the inner peripheral surface of the casing 1122, the electromagnetic coils 100 (100A and 100B) are arranged in a cylindrical shape to oppose the permanent magnets 200 of the rotor 1121 at an interval. That is, in the motor unit 1120, the electromagnetic coil 100 functions as a stator and rotates the rotor 1121 around the center shaft 230 as the center. In addition, between the electromagnetic coil 100 and the casing 1122, the coil back yoke 115 for enhancing the magnetic force efficiency is disposed.

On the bottom surface of the casing 1122, a position detection unit 300 (also called the "magnetic sensor 300") that detects the position of the permanent magnet 200 and a circuit board 310 including a rotation control circuit for controlling the rotation of the rotor 1121 are provided. The position detection unit 300 is constructed as, for example, a Hall element and is disposed to correspond to the position of the orbit of the permanent magnet 200. The position detection unit 300 is disposed on the circuit board 310 or is connected thereto with a signal line.

A conductor wire branching off from the conductor wire bundle 1025 is connected to the circuit board 310. In addition, the circuit board 310 is electrically connected to the electromagnetic coil 100. The circuit board 310 transmits a detection signal output from the position detection unit 300 to a control unit (not shown) that controls the driving of the power generation device 1100. In addition, the rotation control circuit of the circuit board 310 supplies power to the electromagnetic coil 100 according to the control signal from the control unit to generate a magnetic field and rotate the rotor 1121.

The rotation mechanism unit 1130 and the rotor gear 1213 of the rotor 1121 constitute a planetary gear mechanism to function as a speed reduction gear. The rotation mechanism unit 1130 includes a gear fixing unit 1131, three planetary gears 1132, and a load connection unit 1133. In addition, for the convenience, in FIG. 12, only two planetary gears 1132 are illustrated.

The gear fixing unit 1131 includes an outer gear 1311 which is a substantially annular gear having gear teeth 1131*t* provided on the inner wall surface, and a flange portion 1312 protruding from the outer periphery of the outer gear 1311. The gear fixing unit 1131 is mounted to be fixed to the motor unit 1120 as the flange portion 1312 is fastened to the side wall end surface of the casing 1122 of the motor unit 1120 by a fixing bolt 1114.

The outer gear 1311 of the gear fixing unit 1131 is accommodated in the recessed portion 1212 of the rotor 1121. In addition, between the inner peripheral surface of the outer gear 1311 and the outer peripheral surface of the rotor gear 1213, the three planetary gears 1132 are disposed at substantially equal intervals along the outer periphery of the rotor gear 1213. In addition, as gear teeth 1132*t* of the planetary gear 1132 mesh with the gear teeth 1131*t* of the outer gear 1311 and the gear teeth 1121*t* of the rotor gear 1213, these three types of gears 1213, 1132, and 1311 are connected.

The load connection unit 1133 is a substantially cylindrical member functioning as a planetary carrier. At the center of the bottom surface of the load connection unit 1133, a through-hole 1331 through which the center shaft 230 is inserted is provided. Between the inner wall surface of the through-hole 1331 and the outer peripheral surface of the center shaft 230, the bearings 240 are disposed to enable the load connection unit 1133 to rotate around the center shaft 230 as the center. In addition, between the bearing 240 mounted to the load connection unit 1133 and the bearing 240 mounted to the rotor 1121, a spacer 1115 is disposed.

Here, in the center portion of the gear fixing unit 1131, a substantially circular opening portion 1313 communicating with the inner peripheral space of the outer gear 1311 is provided, and the load connection unit 1133 is disposed in the opening portion 1313. On the bottom surface on the motor unit 1120 side (on the right of FIG. 12) of the load connection unit 1133, a shaft hole 1332 for rotatably holding a rotating shaft 1132*s* of the planetary gear 1132 accommodated in the recessed portion 1212 of the rotor 1121 is provided.

A bearing ring 241 for enhancing holding characteristics of the center shaft 230 is fitted and mounted to the bottom surface on the outer side (on the left of FIG. 12) of the load connection unit 1133. Moreover, the rotating shaft of a bevel gear 1021 which is a load is fixed to the bottom surface on the outer side of the load connection unit 1133 by the fixing bolt 1114. In this embodiment, since the load connection unit 1133 is not fixed to the center shaft 230, even though a load is applied to the load connection unit 1133, a torsional torque is not applied to the center shaft 230.

FIG. 13 is a diagram showing the relationships between inputs, outputs, increases in speed, and reductions in speed of the sun gear (SG), the outer gear (OG), and the planetary carrier (PC). In this embodiment, the rotation mechanism unit 1130 has the planetary gear. In the planetary gear, one of the sun gear (SG), the outer gear (OG), and the planetary gear (PC) may function as an input unit (provided integrally with or connected to the rotor 1121), one of the two remaining gears may function as an output unit (provided integrally with or connected to the load connection unit 1133), and the remaining one gear may function as a fixing unit (provided integrally with or connected to the stator (casing) 1122). Regarding the planetary gear, whether the planetary gear is used as a speed reduction gear or a speed-up gear may be determined by designation of the sun gear (SG), the outer gear (OG), and the planetary carrier (PC) between the input unit, the fixing unit, and the output unit. In other words, designation between the input unit, the fixing unit, and the output unit is determined by whether the planetary gear is used as the speed reduction gear or the speed-up gear. In addition, a speed reduction ratio (speed increase ratio) at this time may be determined by the number of teeth of the sun gear (SG) and the outer gear (OG). Assuming that the number of teeth of the sun gear is Za and the number of teeth of the outer gear is Zc, the speed reduction ratio in each state and the rotational direction of the output unit with respect to the rotational direction of the input unit have the relationships shown in FIG. 13.

According to this embodiment, since the center shaft 230 is formed of the carbon-fiber-reinforced plastic made by solidifying the carbon fiber woven fabric of which the carbon fiber direction is at an angle of 45° with respect to the axial direction with the resin, it is possible to increase the torsional strength of the center shaft 230. In addition, this embodiment has a construction in which a load is not directly applied to the center shaft 230 and thus the increase in the torsional strength of the center shaft 230 has a significant effect.

Third Embodiment

Figure 14:
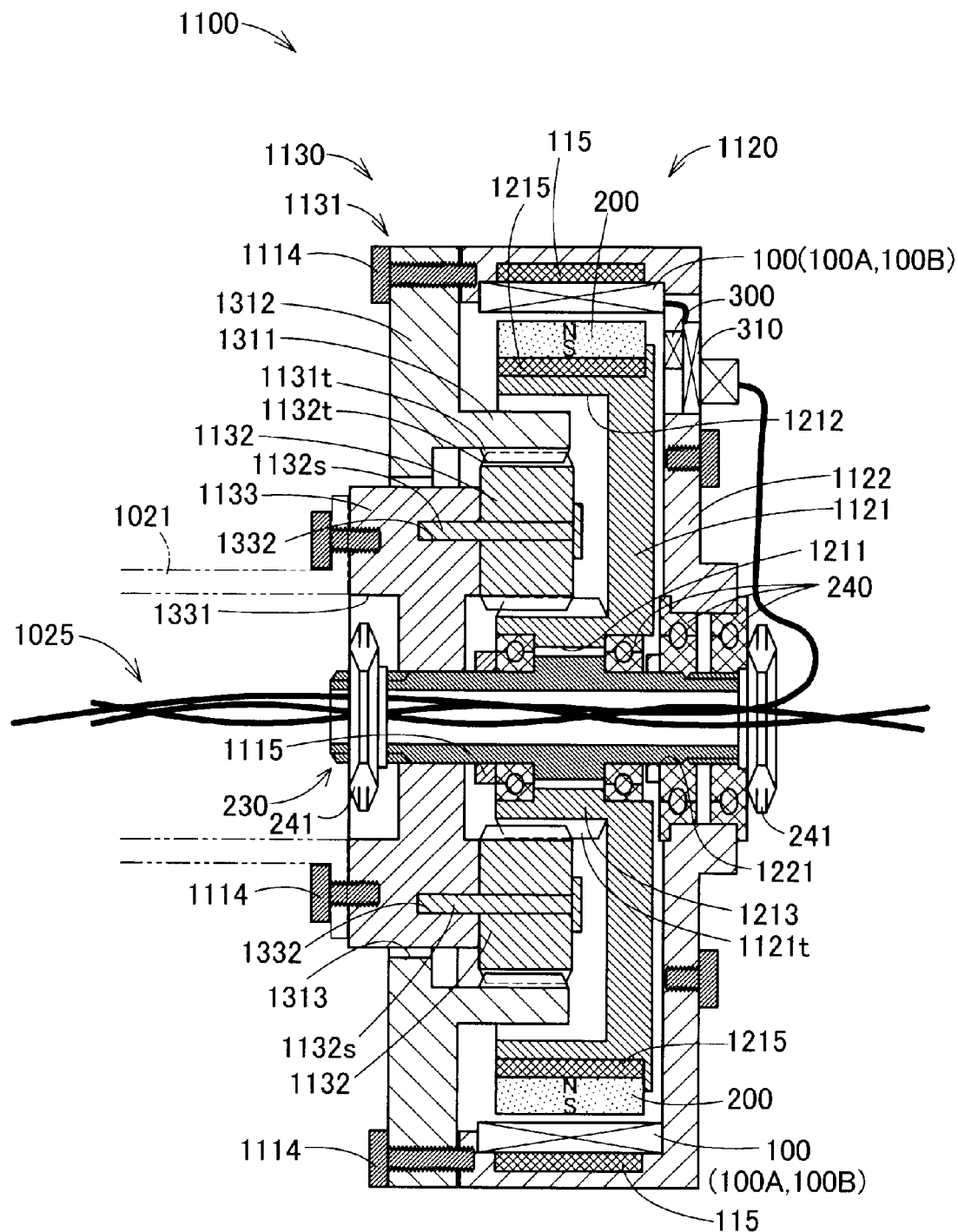
FIG. 14 is a diagram illustrating a third embodiment.

FIG. 14 is a diagram illustrating a third embodiment. The third embodiment is different from the second embodiment in the following aspects. In the third embodiment, the bearing 240 is disposed between the casing 1122 and the center shaft 230. That is, the center shaft 230 is formed to be rotatable around the casing 1122. In addition, the load connection unit 1133 and the center shaft 230 are connected to each other. Accordingly, the center shaft 230 rotates along with the load connection unit 1133. That is, the third embodiment has a construction in which a higher torsional load is applied to the center shaft 230 than in the second embodiment. However, since the center shaft 230 is formed of the carbon-fiber-reinforced plastic made by solidifying the carbon fiber woven fabric of which the carbon fiber direction is at an angle of 45° with respect to the axial direction with the resin, it is possible to increase the torsional strength of the center shaft 230. Therefore, even in the construction in which a high torsional load is applied to the center shaft 230 as in the third embodiment, a sufficient torsional strength is provided.

In addition, this embodiment has a construction in which a load is connected to the load connection unit 1133 and may also employ a construction in which the load is connected to the center shaft 230. In this case, it may be considered that the center shaft 230 and the load connection unit 1133 are in one body.

Fourth Embodiment

Figure 15A:
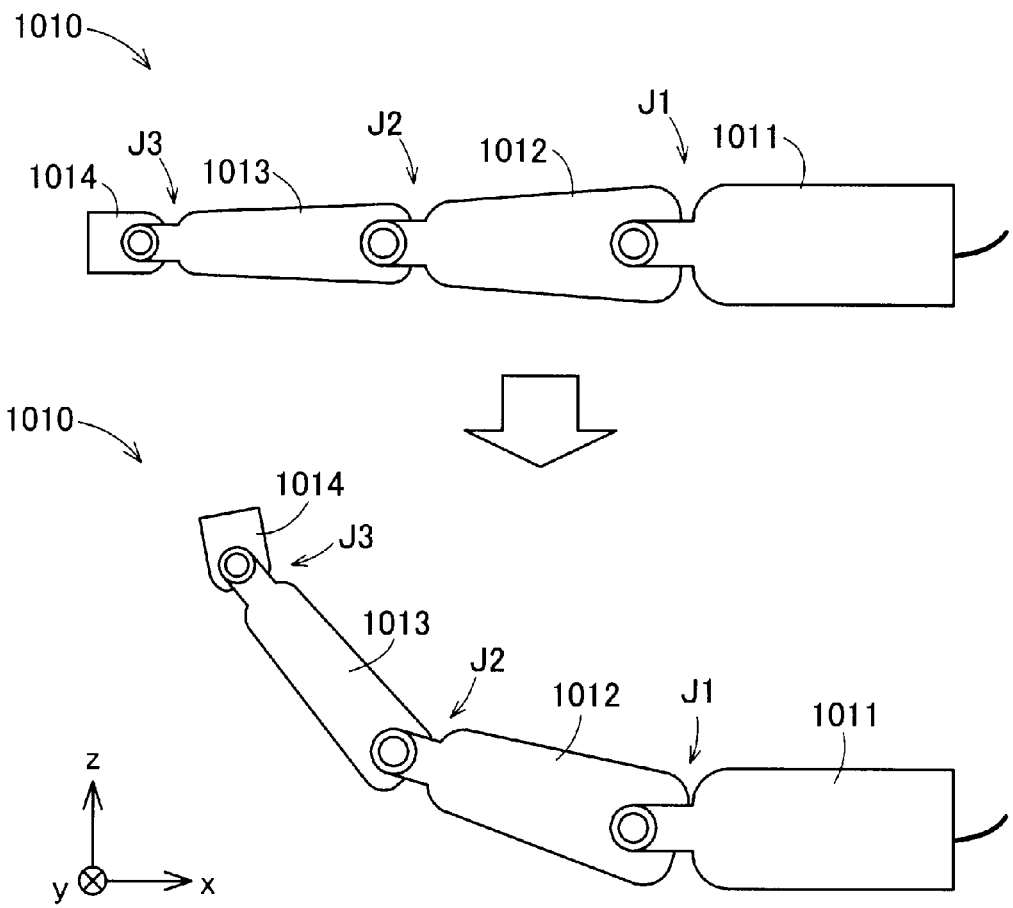
FIGS. 15A and 15B are schematic diagrams illustrating the construction of a robot arm (also called a "robot hand") according to a fourth embodiment of the invention.
Figure 15B:
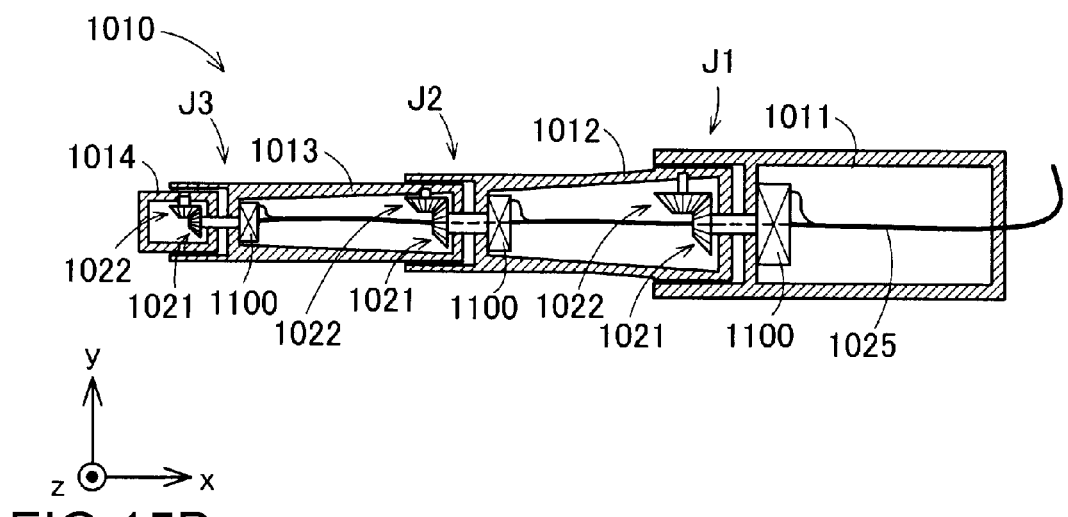

FIGS. 15A and 15B are schematic diagrams illustrating the construction of a robot arm 1010 (also called a "robot hand") according to a fourth embodiment of the invention. FIG. 15A is a schematic diagram illustrating forms of a change in the shape of the robot arm 1010 and illustrates the robot arm 1010 before the change in the shape and the robot arm 1010 after the change in the shape. In addition, in FIG. 15A, three-dimensional arrows x, y, and z orthogonal to each other are illustrated.

The robot arm 1010 includes four base body portions 1011 to 1014. The four base body portions 1011 and 1014 are connected in series to one another via first to third joint portions J1 to J3. Thereafter, in the robot arm 1010, the first base body portion 1011 side is called a "rear end side", and the fourth base body portion 1014 side is called a "front end side".

The robot arm 1010 is changed in a bent shape as a whole as the connection angles of the base body portions 1011 to 1014 are changed by the rotations of the joint portions J1 to J3. In addition, in FIG. 15A, as a form after a change in the shape of the robot arm 1010, a state of the robot arm 1010 being bent upward in the figure is illustrated.

FIG. 15B is a schematic cross-sectional view illustrating the internal construction of the robot arm 1010. In addition, in FIG. 15B, three-dimensional arrows x, y, and z are shown to correspond to those of FIG. 15A. The inside of each of the base body portions 1011 to 1014 is hollow, and accommodates the power generation device 1100 as a power source of each of the joint portions J1 to J3 and two bevel gears 1021 and 1022 to which the driving force is transmitted from the power generation device 1100. Hereinafter, the construction of the first joint portion J1 connecting the first and second base body portions 1011 and 1012 is described. In addition, the constructions of the second joint portion J2 connecting the second and third base body portions 1012 and 1013 and the third joint portion J3 connecting the third and fourth base body portions 1013 and 1014 are the same as that of the first joint portion J1, so that description thereof will be omitted.

The power generation device 1100 has a motor generating a rotational driving force by an electromagnetic force. The internal construction of the power generation device 1100 is described in advance according to the second and third embodiments. The power generation device 1100 is disposed on the front end side of the first base body portion 1011 and is connected to the rotating shaft of the first bevel gear 1021. The first bevel gear 1021 is disposed so that the rotating shaft thereof penetrates through the boundaries of the first and second base body portions 1011 and 1012, and a gear part provided at the front end of the rotating shaft is disposed in the second body portion 1012.

The second bevel gear 1022 is fixed and mounted to the inner wall surface of the second base body portion 1012 so that the gear part thereof is connected to the gear part of the first bevel gear 1021 on the rear end side of the second base body portion 1012. By the rotational driving force transmitted from the power generation device 1100, the first bevel gear 1021 is rotated. By the rotation of the first bevel gear 1021, the second bevel gear 1022 is rotated, thereby rotating the second base body portion 1012.

However, the conductor wire bundle 1025 which is a bundle of conductor wires for transmitting power or a control signal to each of the power generation devices 1100 is inserted through the internal part of the robot arm 1010. Specifically, the conductor wire bundle 1025 is inserted through the internal part of the first base portion 1011 from the rear end side, a conductor wire branches off from a part of the bundle and is connected to a connection portion of the power generation device 1100 in the first base body portion 1011. In addition, the remaining conductor wire bundle 1025 extends to the second base body portion 1012 through the through-hole 239 (see FIG. 12) passing through the center of the power generation device 1100 and a through-hole (not shown) penetrating through the center shaft of the first bevel gear 1021.

The conductor wire bundle 1025 is disposed in the second base body portion 1012 in a similar manner. That is, a part of the conductor wire bundle 1025 inserted through the internal part of the second base body portion 1012 is connected to the power generation device 1100, and the remaining part is inserted into the third base body portion 1013 through the power generation device 1100 and the internal part of the first bevel gear 1021. In addition, the conductor wire bundle 1025 inserted into the third base body portion 1013 is connected to the power generation device 1100.

When the conductor wire bundle 1025 is exposed to the outside from each of the joint portions J1 to J3, due to a change in the shape of the robot arm, there is a possibility of the conductor wire bundle 1025 being pinched between the base body portions 1011 to 1014 at each of the joint portions J1 to J3 and thus being deteriorated. In addition, as the conductor wire bundle 1025 is exposed to the outside, there is a possibility of designability of the robot arm being degraded. However, since the robot arm 1010 of this embodiment does not expose the conductor wire bundle 1025 to the outside, occurrence of this inconvenience is suppressed.

Fifth Embodiment

Figure 16:
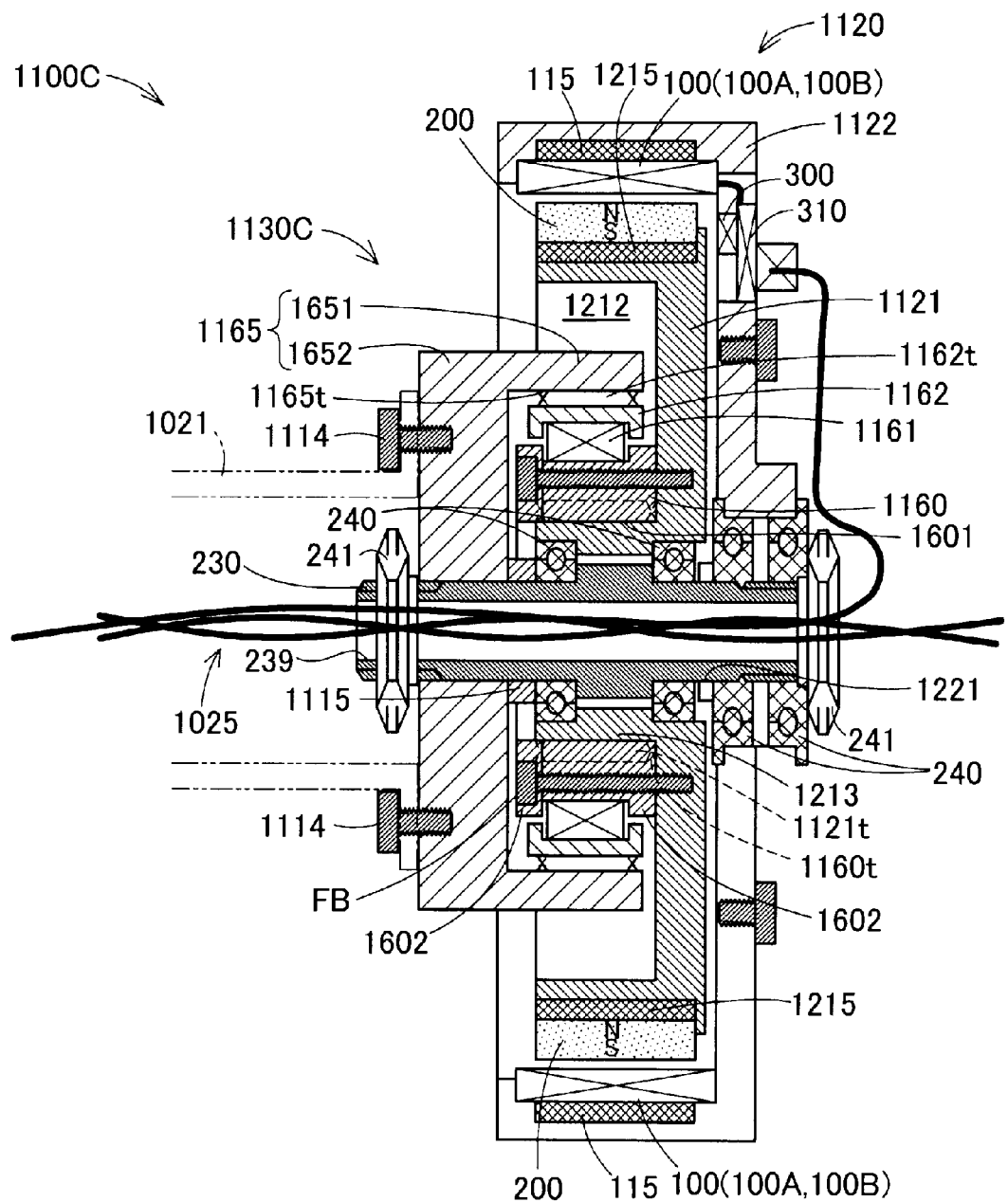
FIG. 16 is a schematic diagram illustrating the construction of a power generation device according to a fifth embodiment of the invention.

FIG. 16 is a schematic diagram illustrating the construction of a power generation device 1100C according to a fifth embodiment of the invention. In the third embodiment illustrated in FIG. 14, the rotation mechanism unit 1130 constructed with the planetary gear is included. However, the fifth embodiment is different in that a rotation mechanism unit 1130C having a harmonic drive mechanism instead of the planetary gear is included.

In the power generation device 1100C, in the recessed portion 1212 of the rotor 1121, as the rotation mechanism unit 1130C, a wave generator 1160, a flex spline 1162, and a circular spline 1165 making up the harmonic drive mechanism are accommodated. The wave generator 1160 is a substantially elliptical cylinder member in which the bottom surface has a substantially oval shape.

In the wave generator 1160, a through-hole 1601 penetrating in the center axis direction (the left and right direction in the figure) is provided, and on the inner wall surface of the through-hole 1601, gear teeth 1160t are formed. The wave generator 1160 is fastened to the rotor 1121 by a fastening bolt FB in a state where the rotor gear 1213 is fitted and accommodated into the through-hole 1601. Accordingly, the wave generator 1160 rotates along with the rotation of the rotor 1121.

However, flange portions 1602 are provided to protrude in the outer peripheral direction from both end portions of the wave generator 1160. The flange portions 1602 are for preventing the flex spline 1162 disposed on the outer periphery of the wave generator 1160 from falling out. The separated flange portions 1602 are fixed by the fastening bolts FB after the flex spline 1162 is disposed.

The flex spline 1162 is an annular member which is deformable according to the rotation of the wave generator 1160 and has flexibility, and has gear teeth 1162t formed on the outer peripheral surface. In addition, on the inner peripheral surface of the flex spline 1162, a bearing 1161 for smooth rotation of the wave generator 1160 is disposed.

The circular spline 1165 is accommodated in the recessed portion 1212 of the rotor 1121, and includes a front stage portion 1651 that accommodates the flex spline 1162 on the inner side, and a rear stage portion 1652 through which the center shaft 230 is inserted and to which the rotating shaft of the bevel gear 1021 is connected. On the inner peripheral surface of the front stage portion 1651, gear teeth 1165$t$ meshing with the gear teeth 1162$t$ of the flex spline 1162 are formed. Between the rear stage portion 1652 and the center shaft 230, the bearing 240 for enabling the circular spline 1165 to rotate is disposed.

In general, in the harmonic drive mechanism, a backlash may be omitted, and thus transmission of rotation can be achieved with high precision. In the power generation device 1100C of the third embodiment, the rotation mechanism unit 1130C included in the harmonic drive mechanism is integrally accommodated in the recessed portion 1212 of the rotor 121. Therefore, an actuator or a manipulator which is compact and has high operation precision can be constructed by the power generation device 1100C.

Even in the harmonic drive mechanism, similar to the planetary gear of the second embodiment, one of the wave generator 1160, the flex spline 1162, and the circular spline 1165 may function as an input unit, one of the two remainders may function as a fixing unit, and the one remainder may function as an output unit. Accordingly, it is possible to use the harmonic drive mechanism as a speed reduction gear or a speed-up gear. In addition, a diaphragm may be connected to the flex spline 1162, and instead of the flex spline 1162, a diaphragm input unit, a fixed unit, and an output unit may be employed.

Figure 17:
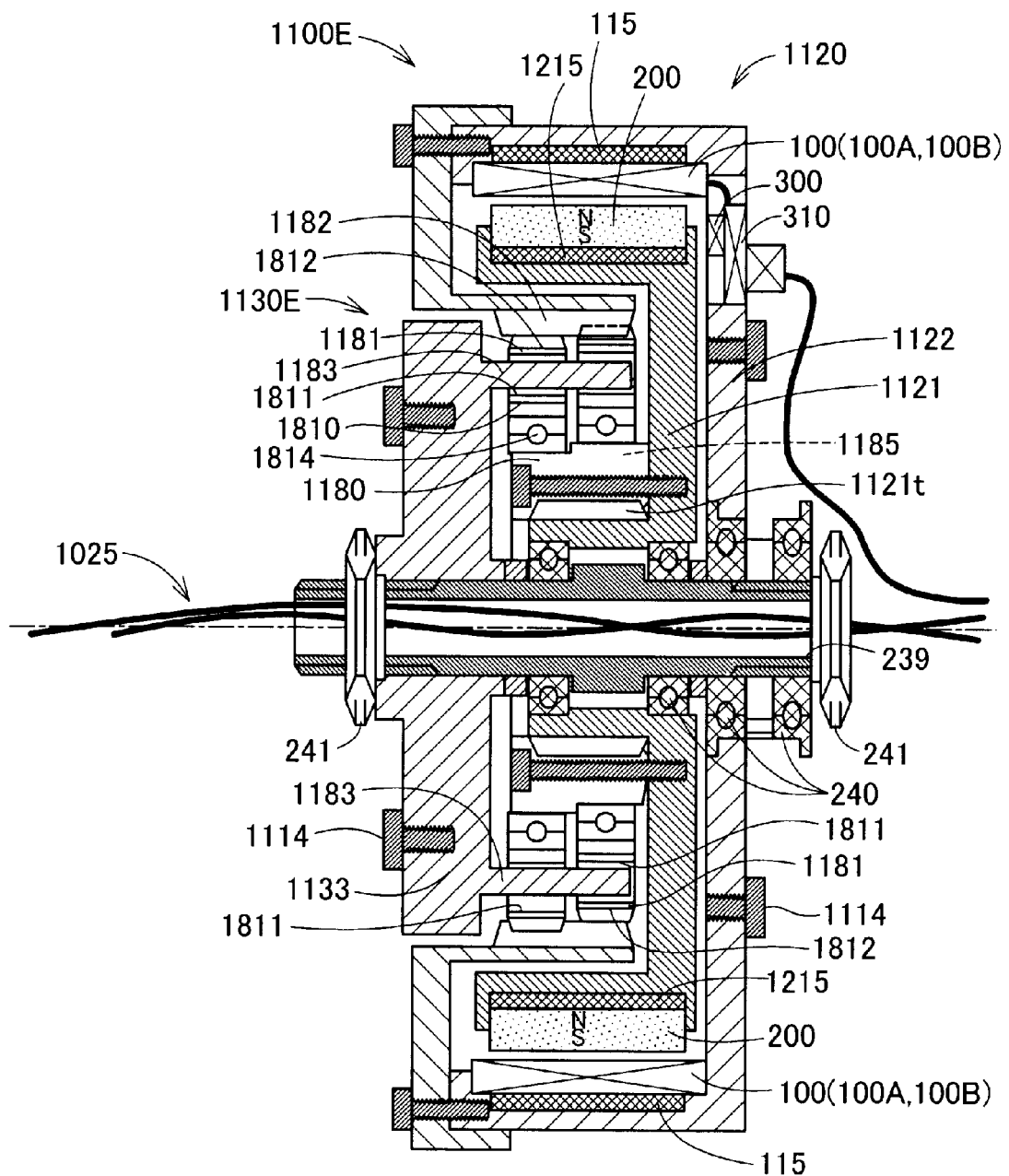
FIG. 17 is a schematic diagram illustrating the construction of a power generation device according to a sixth embodiment of the invention.

FIG. 17 is a schematic diagram illustrating the construction of a power generation device 1100E according to a sixth embodiment of the invention. The power generation device 1100E has a construction in which a cycloidal mechanism and a motor are integrated and transmits a rotational driving force to the load connection unit 1133. The power generation device 1100E is different from the power generation device 1100 of the third embodiment in the following aspects. That is, the power generation device 1100E includes the cycloidal mechanism as a rotation mechanism unit 1130E in the recessed portion 1212 of the rotor 1121.

The cycloidal mechanism includes eccentric bodies 1180 and 1185, a curved plate 1181, outer pins 1182, inner pins 1183, and a bearing 1814. The curved plate 1181 has a substantially discoid shape and has a center hole 1810 at the center portion, and eight inner pin holes 1811 are provided around the periphery of the center hole 1810. The inner pin holes 1811 are arranged on the circumference at an interval of 45 degrees. The outer periphery of the curved plate 1181 has an epitrochoid parallel line shape. In this embodiment, the number of crests of the epitrochoid parallel line shape is 9, and with a rotation of 40 degrees, the epitrochoid parallel line shape overlaps. In addition, in this embodiment, the cycloidal mechanism includes two curved plates 1181 which are deviated at 180 degrees. As a result, a convex portion of the epitrochoid parallel line shape of the one curved plate 1181 is positioned in a concave portion of the epitrochoid parallel line shape of the other curved plate 1181.

The outer pin 1182 is connected to the casing 1122 and is a member having a substantially circular shape on the curved plate 1181 side. The outer pin 1182 may be a columnar bar. Although two outer pins are illustrated in FIG. 17, in this embodiment, ten outer pins 1182 are present and are arranged at an interval of 36 degrees on the circumference to contact the outer periphery of the curved plate 1181.

The inner pin 1183 is a columnar bar connected to the load connection unit 1133. The same number of (eight) inner pins 1183 as the inner pin holes 1811 are present and are arranged at an interval of 45 degrees on the circumference. The thickness of the inner pin 1183 is smaller than the size of the inner pin hole 1811, so that the inner pin 1183 is inserted into the inner pin hole 1811. In addition, the circumference on which the inner pins 1183 are arranged has the same magnitude as the circumference on which the inner pin holes 1811 are arranged.

The eccentric bodies 1180 and 1185 each have a columnar shape and are connected to the rotor 1121. The center of the eccentric body 1180 is deviated from the rotational center of the eccentric body 1180. This is similar to the eccentric body 1185.

When the motor unit 1120 rotates the rotor 1121, the eccentric body 1180 is rotated. Since the center of the eccentric body 1180 is deviated from the rotational center of the eccentric body 1180, eccentric rotation occurs. The outer side of the eccentric body 1180 acts on the center hole 1810 of the curved plate 1180 to move the curved plate 1181. Here, the curved plate 1181 is restricted by the outer pin 1182 and eccentrically rotates. With the eccentric rotation of the curved plate 1181, the inner pin hole 1811 of the curved plate 1181 also eccentrically rotates. The inner pin hole 1811 acts on the inner pin 1183 and the inner pin 1183 rotates together with the load connection portion 1133.

In this embodiment, when the eccentric body 1180 makes one revolution, the curved plate 1181 makes 1/9 revolution. For example, assuming that the number of convex portions of the epitrochoid parallel line shape of the curved plate 1181 is n and the number of outer pins is (n+1), when the eccentric body 1180 makes one revolution, the curved plate 1181 makes 1/n revolution. Therefore, an extremely high speed reduction ratio may be obtained. In addition, since a sliding contact is converted into a rolling contact by the outer pin 1182, mechanical losses are very small, and an extremely high gear efficiency may be obtained.

Figure 18:
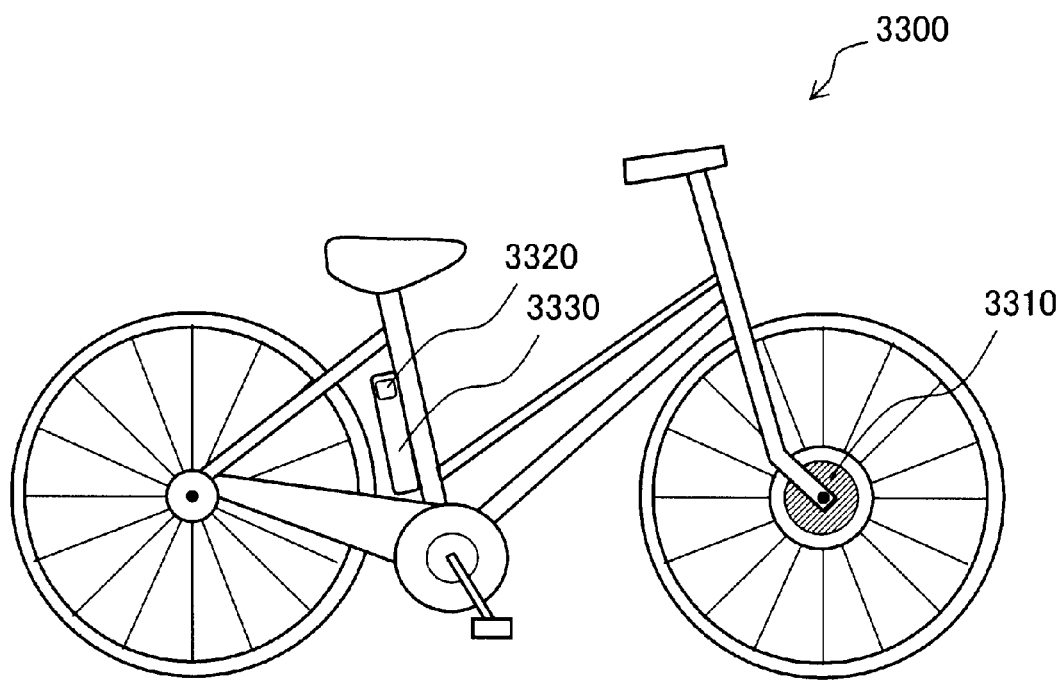
FIG. 18 is a diagram illustrating an electric bicycle (electric assist bicycle) as an example of a movable body using a motor or a generator according to a modified embodiment of the invention.

FIG. 18 is a diagram illustrating an electric bicycle (electric assist bicycle) as an example of a movable body using a motor or a generator according to a modified embodiment of the invention. A bicycle 3300 is provided with a motor 3310 in the front wheel, and a control circuit 3320 and a rechargeable battery 3330 are provided in a frame below the saddle. The motor 3310 assists in running by driving the front wheel using the power from the rechargeable battery 3330. In addition, during braking, the rechargeable battery 3330 is charged with the power regenerated by the motor 3310. The control circuit 3320 is a circuit that controls driving of the motor and regeneration. As the motor 3310, various types of coreless motors 10 described above may be used.

Figure 19:
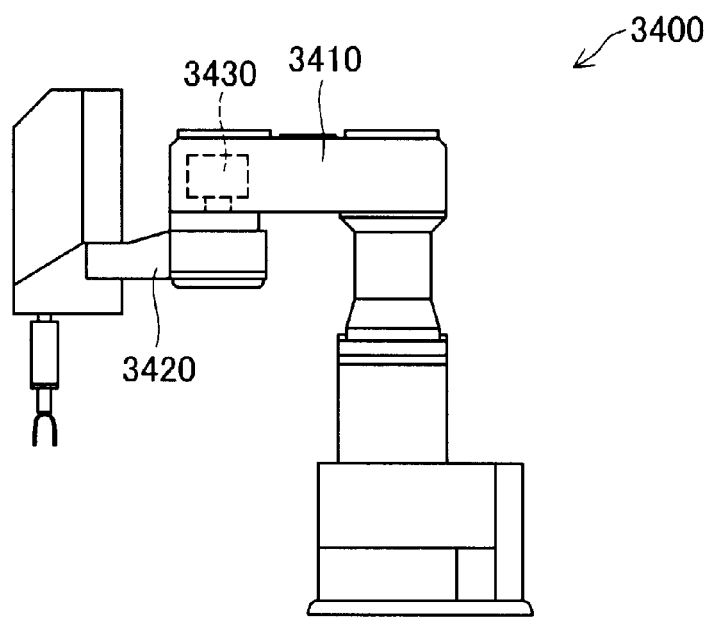
FIG. 19 is a diagram illustrating an example of a robot using the motor according to the modified embodiment of the invention.

FIG. 19 is a diagram illustrating an example of a robot using the motor according to the modified embodiment of the invention. The robot 3400 has first and second arms 3410 and 3420 and a motor 3430. The motor 3430 is used to horizontally rotate the second arm 3420 as a driven member. As the motor 3430, various types of careless motors 10 described above may be used.

Figure 20:
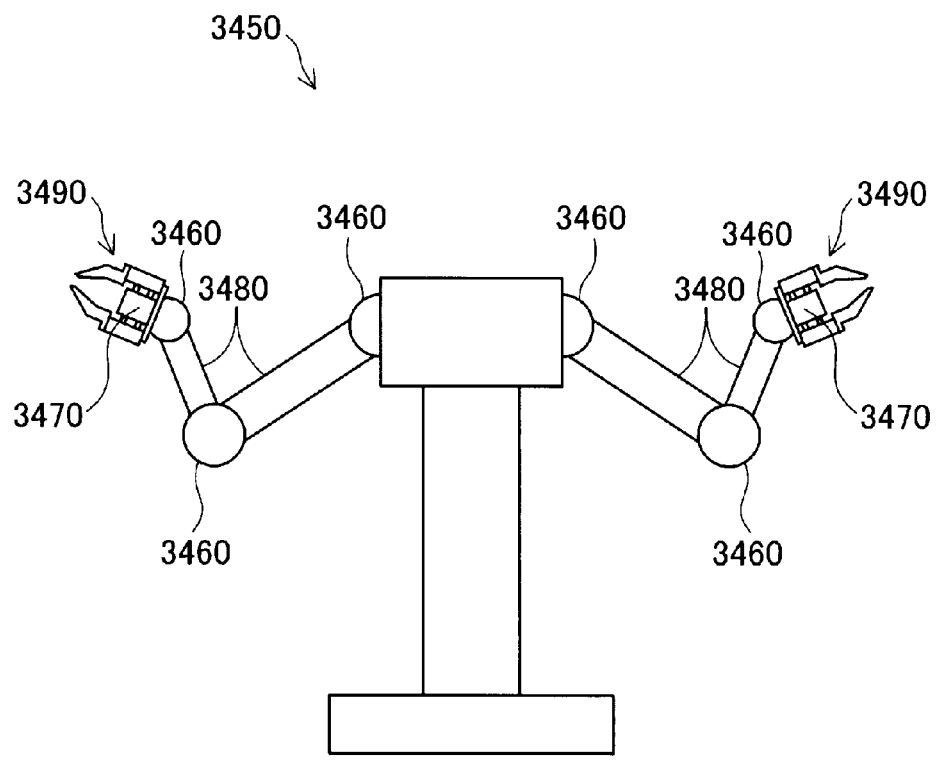
FIG. 20 is a diagram illustrating an example of a dual-armed 7-axis robot using the motor according to the modified embodiment of the invention.

FIG. 20 is a diagram illustrating an example of a dual-armed 7-axis robot using the motor according to the modified embodiment of the invention. A dual-armed 7-axis robot 3450 includes joint motors 3460, gripping part motors 3470, arms 3480, and gripping parts 3490. The joint motors 3460 are disposed at positions corresponding to shoulder joints, elbow joints, and wrist joints. The joint motor 3460 includes two motors for each joint in order to three-dimensionally operate the arms 3480 and the gripping parts 3490. The gripping part motor 3470 opens and closes the gripping part 3490 to enable the gripping part 3490 to grip an object. In the dual-armed 7-axis robot 3450, as the joint motors 3460 or the gripping part motors 3470, various types of coreless motors described above may be used.

Figure 21:
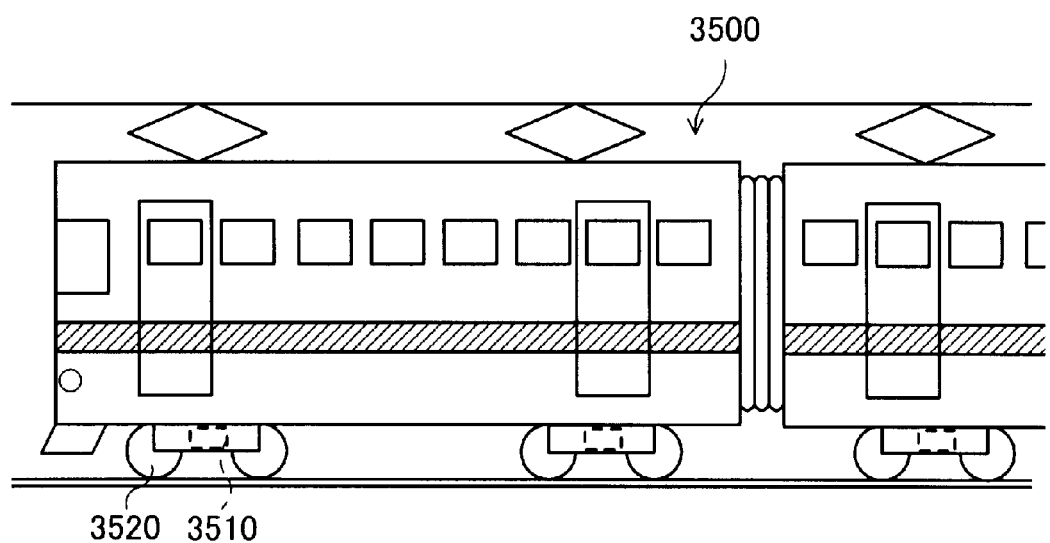
FIG. 21 is a diagram illustrating a rail vehicle using the motor according to the modified embodiment of the invention.

FIG. 21 is a diagram illustrating a rail vehicle using the motor according to the modified embodiment of the invention. A rail vehicle 3500 has an electric motor 3510 and a wheel 3520. The electric motor 3510 drives the wheel 3520. Moreover, the electric motor 3510 is used as a generator during braking of the rail vehicle 3500 to regenerate power. As the electric motor 3510, various types of coreless motors 10 described above may be used.

While the embodiments of the invention have been described on the basis of several embodiments, the embodiments of the invention described above are intended for facilitating understanding of the invention and do not limit the invention. It should be noted that modifications and improvements of the invention can be made without departing from the spirit and scope of the appended claims and the equivalents thereof are contained in the invention.

The present application claims priority based on Japanese Patent Application No. 2011-129659 filed on Jun. 10, 2011, the disclosure of which is hereby incorporated by reference in its entirety.

What is claimed is:

1. An electromechanical device comprising:
   a center shaft;
   a rotor having a rotor magnet disposed around an outer periphery of the center shaft; and
   a stator disposed on an outer periphery of the rotor,
   wherein the center shaft is formed of a carbon-fiber-reinforced plastic, and
   when projection is performed in a radial direction from the center shaft toward the rotor magnet, an angle between a direction of carbon fiber in the carbon-fiber-reinforced plastic and a direction of the center shaft is 45°.

2. The electromechanical device according to claim 1,
   wherein the carbon-fiber-reinforced plastic of the center shaft is made by solidifying, with a resin into a cylindrical shape, woven fabric formed by plaiting flatly bundled carbon fiber bundles.

3. A robot comprising the electromechanical device according to claim 2.

4. A movable body comprising the electromechanical device according to claim 2.

5. A robot comprising the electromechanical device according to claim 1.

6. A movable body comprising the electromechanical device according to claim 1.

7. The movable body according to claim 6, wherein the movable body is a vehicle.

8. A method of manufacturing an electromechanical device comprising:
   forming a carbon fiber bundle using carbon fiber;
   forming a woven fabric by plaiting the carbon fiber bundles;
   winding the woven fabric into a cylindrical shape so that the angle between a direction of the carbon fiber of the woven fabric and a winding direction becomes 45°;
   producing a center shaft by solidifying the woven fabric with a carbon-fiber-reinforced plastic;
   disposing a permanent magnet around a periphery of the center shaft;
   forming a rotor by molding the center shaft and the permanent magnet using a resin; and
   assembling the rotor to a stator having an electromagnetic coil.

* * * * *